(12) United States Patent
Hansen et al.

(10) Patent No.: US 6,562,267 B1
(45) Date of Patent: May 13, 2003

(54) PROCESS FOR THE MANUFACTURE OF A MINERAL WOOL PLANT GROWTH SUBSTRATE

(75) Inventors: Erling Lennart Hansen, Gentoffe (DK); Jacob Frank De Groot, Roermond (NL)

(73) Assignee: Rockwool International A/S, Hedenhusene (DK)

( * ) Notice: Subject to any disclaimer, the term of this patent is extended or adjusted under 35 U.S.C. 154(b) by 0 days.

(21) Appl. No.: 09/601,408

(22) PCT Filed: Feb. 2, 1999

(86) PCT No.: PCT/EP99/00662

§ 371 (c)(1),
(2), (4) Date: Sep. 15, 2000

(87) PCT Pub. No.: WO99/38372

PCT Pub. Date: Aug. 5, 1999

(30) Foreign Application Priority Data

Feb. 2, 1998 (EP) .............................. 98200286

(51) Int. Cl.$^7$ .......................... B29C 67/24; A01G 31/00
(52) U.S. Cl. ...................... 264/109; 264/123; 264/128; 47/57.7; 47/59 R; 47/64
(58) Field of Search ................................ 264/109, 112, 264/113, 120, 123, 128; 47/9, 59 S, 59 R, 57.7, 64

(56) References Cited

U.S. PATENT DOCUMENTS

| | | | | |
|---|---|---|---|---|
| 4,757,108 A | * | 7/1988 | Walisser | 524/596 |
| 4,769,277 A | | 9/1988 | Meunier | 428/280 |
| 4,777,763 A | * | 10/1988 | Shannon et al. | 47/74 |
| 5,099,605 A | * | 3/1992 | Moffet, Jr. | 47/59 |
| 5,218,783 A | | 6/1993 | Langezaal et al. | 47/64 |
| 5,287,651 A | * | 2/1994 | De Graaf | 47/66 |
| 5,471,786 A | * | 12/1995 | Clausen | 47/59 |
| 5,600,919 A | * | 2/1997 | Kummermehr et al. | 47/59 |
| 5,888,803 A | * | 3/1999 | Starkey | 435/254.1 |
| 6,042,630 A | * | 3/2000 | de groot | 71/64.13 |

FOREIGN PATENT DOCUMENTS

| | | |
|---|---|---|
| EP | 0485277 A1 | 5/1995 |
| GB | 2189478 | 10/1987 |
| WO | WO9707664 | 3/1997 |

* cited by examiner

Primary Examiner—Stefan Staicovici
(74) Attorney, Agent, or Firm—Webb Ziesenheim Logsdon Orkin & Hanson, P.C.

(57) ABSTRACT

The present invention relates to a process for the manufacture of mineral wool plant growth substrate having a coherent hydrophilic matrix of mineral wool fibres connected by cured binder, comprising the steps of: providing mineral wool fibres; applying to the mineral wool fibres as a binder a phenol-formaldehyde resin and a furan resin; forming a matrix of the mineral wool fibres; and curing the binder and to the obtainable mineral wool plant growth substrate.

13 Claims, No Drawings

PROCESS FOR THE MANUFACTURE OF A MINERAL WOOL PLANT GROWTH SUBSTRATE

BACKGROUND OF THE INVENTION

1. Field of the Invention

The present invention relates to a process for the manufacture of a mineral wool plant growth substrate, and the obtainable mineral wool plant growth substrate.

2. Description of the Prior Art

Plant growth substrates may have the form of plugs accommodatable in a tray hole, of cubes having a foil around the standing side surfaces, of plastic rapped slabs, or of grannulate.

Conventional mineral wool plant growth substrates are based on a coherent matrix of mineral wool of which the mineral wool fibres are mutually connected by cured binder which is generally a phenol-formaldehyde resin. Due to the use of this type of binders the matrix of mineral wool has to be provided with a so called wetting agent in order to impart the hydrophobic mineral wool matrix with hydrophilic properties. That is, the matrix can absorb in a relatively short time period up to saturation amounts of water. This type of conventional plant growth substrates imparted with hydrophilic properties by the use of a wetting agent are for instance disclosed in GB-A-1 336 426. The use of wetting agents, in particular of Triton trade name has several disadvantages. One disadvantage is that Triton may have toxic, effects, and is leached out of the plant growth substrates after a period of flushing nutrient solution through the plant growth substrate. This means that over a time period the wetting agent is removed out of the matrix of mineral wool such that after water depletion it is difficult if not impossible to rewet the hydrophilic plant growth substrate because it lost its hydrophilic properties.

WO 97/07664 discloses a hydrophilic plant growth substrate that obtained its hydrophilic properties from the use of a furan resin as a binder. The use of a furan resin allows the abandonment of the use of a wetting agent. Accordingly, this known hydrophilic plant growth substrate does not suffer from the disadvantages relating to the use of a wetting agent, in particular of Triton. A disadvantage of the use of a furan resin as a binder for a coherent matrix of mineral wool fibres for a plant growth substrate, is that the furan resin is relatively expensive. Accordingly, the use of these hydrophilic plant growth substrates having a cured furan resin binder is less economical.

It is disclosed in WO 97/07664 that the furan resin may consist in a copolymer of the furan molecule monomer and other monomers, such as formaldehyde and phenol. Formaldehyde and phenol may be used in amounts up to 50% and examplefied is an amount of 5–10%. Although it is reported that using these monomers the hydrophilic character may be adjusted in the desired sense, it is found that there is insufficient control of the polymerization of the furan monomers on the one hand and formaldehyde and phenol on the other, so that expensive installations or difficult formulation recepies are required for obtaining an hydrophilic plant growth substrate. The complex manufacturing process results in relatively expensive hydrophilic plant growth substrates.

SUMMARY OF THE INVENTION

The invention has for its object to provide a hydrophilic plant growth substrate that does not suffer from the disadvantages in relation to the use of a wetting agent or the disadvantage of using a furan resin or a copolymer of furan and phenol formaldehyde.

The present invention is based on the finding that when mineral wool fibres are provided with a phenol formaldehyde resin and provided with a furan resin, that is with two separate resin polymers and not with one resin copolymer, hydrophilic properties are obtainable without the use of a wetting agent and while using a relatively small amount of furan resin in relation to the phenol formaldehyde resin.

Accordingly, the present invention provides a process for the manufacture of a mineral wool plant growth substrate having a coherent hydrophilic matrix of mineral wool fibres connected by cured binder, comprising the steps of:

i. providing mineral wool fibres;
ii. applying to the mineral wool fibres as a binder a phenol-formaldehyde resin and a furan resin;
iii. forming a matrix of the mineral wool fibres; and
iv. curing the binder.

The plant growth substrates according to the invention comprise a coherent matrix of mineral wool. As mineral wool may be used stone wool, glass wool and/or slag wool. These matrices are produced using conventional production methods which only depend on the starting

DETAILED DESCRIPTION OF THE PREFERRED EMBODIMENTS

For the plant substrates according to the invention, use may be made of a coherent matrix of mineral wool. Coherency is obtained by curing the applied furan resin such that the mutual fibres are mechanically connected. However, it is noted that the plant growth substrate may consist of a so-called granulate having the form of mineral wool flakes comprising a number of fibres and having a particle size of 0.2–5 cm.

Hydrophilic character means in the context of the present invention that water is absorbed to a substantial extent/amount which may be measured in the so-called sinking test in water to which is not added any surfactant or mechanical force is applied to the substrate. It is noted that without the inclusion of a wetting agent the plant growth substrate of the invention has good plant growth (hydrophilic) properties. In the sinking test the sinking time of the hydrophilic plant growth substrate according to the present invention is generally less than 1 minute, in particular less than 30 seconds, and preferably and most times in the range of 5–25 seconds.

The density of the hydrophilic plant growth substrate according to the present invention is adjustable and depends on the density of the plant growth substrate just before the binder mixture of phenol formaldehyde resin and furan resin is cured. The density is generally in the range of 10 kg/m$^3$ to 150 kg/m$^3$ and practically in the range 30–100 kg/M$^3$, such as 40–70 kg/m$^3$.

By phenolic resins are meant the group of phenole based resins, e.g. phenol-formaldehyde resin and phenol-urea-formaldehyde resin, as they are described in for instance Knop and Pilato: "Phenolic resins", Springer Verlag 1985". The phenol-formaldehyde resins are well known in the art as thermocurable binders. The resin preparation can be used in a non-polymerized or partly polymerized form. The resin preparation is atomized into a gas flow and after contact with mineral fibres is deposited thereon and cured by a temperature treatment, whereby the mineral wool-containing fibres are mutually joined by the cured resin.

The phenol-formaldehyde resin contains both phenol and formaldehyde in a molar ratio of 1:2.8 and more, such as up to 1:6. In general the quantity of formaldehyde is over the stoichiometric amount, such as in the ratio 1:3.1 to 1:5, for instance 1:3.6. The excess of formaldehyde avoids the possibility of phenol remaining present in gaseous form in the gas flow and being emitted to the environment after atomizing of the resin preparation and evaporation of the water present therein. Urea is present as an additive for optimal polymerization.

The resin preparation generally also contains ammonia for the purpose of binding the excess amount of formaldehyde relative to phenol. If required the ammonia emission can be significantly repressed by neutralizing ammonia in the resin preparation by making use of a sugar compound. The sugar compound may added before the binder is ready for use even before the ammonia is added. According to one preparation procedure the addition of this sugar compound takes place before atomizing of the resin preparation, thereby avoiding due to the reaction of ammonia with the sugar compound ammonia eventual neutralization and thereby reduction of function as resin stabilizer. Addition of the sugar compound during resin preparation is possible. The resin preparation eventually becomes unstable and unsuitable for use as binder for mineral wool. It is proposed that the sugar compound and/or the ammonia is added to the resin preparation timely before applying of the resin preparation to the mineral wool.

The sugar compound, in general a sugar preparation, can contain any suitable sugar compound, insofar as the sugar compound enters into a reaction with ammonia and does not substantially suppress the action of the resin preparation. Suitable sugar compounds comprise aldoses and ketoses, such as monosaccharides, for instance glucose and fructose, disaccharides such as sucrose, maltose, lactose, oligosaccharides such as syrup, in particular glucose syrup and fructose syrup, and polysaccharides, in particular water-soluble polysaccharides such as dextrin and starch. It is noted that the sugar preparation can contain one or more of these sugar compounds. The sugar preparation can consist of a solid, dispersion but is preferably a solution in water. Optimum mixing with the aqueous resin preparation is thus possible.

If desired, the resin preparation can contain additives for optimal polymerization, such as amides, in particular urea. In respect of urea it is however noted that this has no effect on the ammonia-binding effect of sugar according to the invention because the emission of ammonia does not substantially decrease.

The furan resins that are used in the present invention are based on the polymerization of at least a furan molecule having the general formula

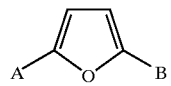

In this general formula A and B are polymerizable groups. Due to polymerization are formed dimer, oligomer and polymer molecules in which the furan ringstructure is separated at least to one other furan structure by the group A and/or B. Furthermore, the furan ring may be less unsaturated, that is may comprise only one or no carbon-carbon double bond at the 2, 3 or 4-position in the ringstructure.

The polymerizable groups A and B may be selected from hydrogen, C1–C10 alkyl groups, polysubstituted vinyl radicals, polysubstituted aromatic groups, ketones, anhydrides, polysubstituted furfuryl, hydroxyls, aldehydes, carboxylic acids, esters, amines, imines, alkynes, alkyl halides, aromatic halides, olefinic halides, ethers, thiols, sulfides, nitriles, nitro groups, sulfones, sulfonic acids, and mixtures thereof.

Accordingly, the repeating groups in the product obtained by polymerization comprise furan, furfural, furfuryl alcohol, 5-hydroxymethyl-2-furancarboxyaldehyde, 5-methyl-2-furancarboxyaldehyde, 2-vinyl furoate, 5-methyl-2-vinylfuroate; 5-tertbutyl-2-vinyl furoate, 2-furfurylmethacrylate, 2-furfuryl methylmethacrylate, 2-vinyl furan, 5-methyl-2-vinyl furan, 2-(2-propylene)furan (or 2-methyl vinylidene furan), 5-methyl-2-methyl vinylidenefuran; furfurylidene acetone, 5-methyl-2-furfurylidene, aceton, 2-vinyl tetrahydrofuran, 2-furyl oxirane, 5-methyl-2-furyloxirane, furfuryl vinyl ether, 5-methyl-furfuryl vinyl ether, vinyl 2-furyl ketone, bis-2,5-carboxyaldehyde furan, bis-2,5-hydroxymethyl furan, 5-hydroxymethyl-2-ethyl furanacrylate, 2,5-furandicarboxylic acid, 2,5-furan diacid dichloride, 2,5-furan dicarboxylic acid dimethyl ester, 2,5-furan methylamine, 5-carboxy-2-furan amine, 5-methylester-2-furan amine, bis-(2,5-methylene isocyanate) furan, bis(2,5-isocyanate) furan, 2-isocyanate furyl, and 2-methylene isocyanate furyl.

Preferred is a furan resin based on furyl alcohol.

The furan resins may be used as a concentrate or in diluted form in a suitable solvent, such as water. The solid content in a furan resin composition when injected may be as from 1 wt %, generally less than 40 wt %, such as 2–30 wt %, like 5–20 wt %. A suitable furan resin binder is a Farez M (TM) type from QO-Chemicals.

The furan resin may be formed by polymerization, such as polyaddition polymerization and condensation polymerization. These polymerizations are known in the art.

In order to reduce the viscosity of the polymerization preparation to be used a co-solvent may be used. Suitable co-solvents are organic mono-, di- and polyacids, such as levulinic acid and maleic acid. Co-solvents may be used in an amount up to 15 wt %, such as 2–10 wt % or generally 4–8 wt %.

In order to cure a furan resin, the furan resin composition may comprise a catalyst. Examples are inorganic and organic acids, such as hydrochloric acid and maleic acid. Other catalyst examples are Friedel-Crafts catalysts, such as aluminum chloride. Other examples are salts of inorganic and organic acids such as ammonium sulphate, ammonium nitrate and urea salt of toluene sulfonic acid. Depending on the type of catalyst there may be used up to 20 wt %, generally in the range of 1–15 wt %, such as preferably 8–10 wt %.

In order to improve the cohesion for binding to the fibre surface or fibre material a coupling agent may be included. Examples of coupling agents are silanes or organotitanates and organozirconates. Examples of suitable silane coupling agents are N-Methyl-3-aminopropyl-trimethoxysilane and 3-aminopropyl-triethoxysilane.

Furthermore, surfactants and extenders may be used in the furan resin composition.

In order to avoid dust formation during plant substrate production and handling a mineral, hydrophobic oil may be added, but the formed substrate maintains its hydrophilic properties.

The binder comprising phenol formaldehyde resin and and furan resin both in the form of separate polymers are applied to the mineral wool fibres after formation and while r-borne. This binder is applied in such an amount that the resin content of the plant growth substrate is about 1–10 wt %, such as 1.5–5 wt %, and particular 2–3.5 wt %.

Preferably the phenol formaldehyde resin is applies first and subsequently the furan resin. Accordingly, it is avoided that the phenol formaldehyde resin covers to a substantial extend the furan resin applied to the mineral wool fibres. Accordingly, the amount of furan resin may be used substantially only for providing hydrophilic properties by exposure. Because the furan resin at the same time adds to the binding and strength properties, the amount of phenol-formaldehyde resin could be reduced. The amount of furan resin is generally such that it complies with the desired hydrophilic properties of the plant growth substrate. Generally any amount of furan resin may be used in combination with the phenol formaldehyde resin as economically is acceptable. Generally the amount of furan resin is 1–50% of the total of applied binder. Preferably the amount of furan resin is 5–40%, and more preferably 10–30% of the applied binder. The remainder is phenol formaldehyde resin.

If it is preferred to apply the phenol formaldehyde resin first and separately from the furan resin, then both resins may be applied via separate nozzles and/or applied via separate spinning wheels (see inter alia WO 95/14135). When using separate nozzles, the phenol formaldehyde resin is applied by nozzles which are upstream from the nozzles applying the furan resin. When spinning wheels are used, the phenol formaldehyde resin is applied on spinning wheels different from the spinning wheels by which the furan resin is applied but such that the desired and optimal hydrophilic properties are obtained. Obviously, the phenol formaldehyde resin and the furan resin may be applied by a combination of nozzles and/or spinning wheels.

The hydrophilic properties may be selected as desired and are widely governed by economic factors. The hydrophilic properties may be determined in a sinking test as disclosed above, or may be determined by the amount of water retained in the plant growth substrate under suction pressure given as centimeter water column units. Preferably the water retaining capacity of the hydrophilic properties are higher and the water retaining capacity of the hydrophilic plant growth substrate according to the present invention is at a suction pressure of 21.5 cm water column at least 15% v/v. Preferably the hydrophilic properties are higher and the water retaining capacity is at least 20% v/v. Generally, the water retaining capacity is at a suction pressure of 21.5 water column in the range of 15–40% v/v. The water retaining capacity is or is in addition at a suction pressure at −10 cm water column at least 70% v/v, preferably at least 75% v/v. The water retaining capacity at −10 cm water column is generally in the range of 70–95% v/v, more particularly in a range of 75–90% v/v. These water retaining capacity values are higher than for traditional hydrophilic plant growth substrates comprising a wetting agent and a phenol formaldehyde resin. Accordingly, these plant growth substrates have under similar conditions a larger amount of adsorbed water and are therefore less vulnerable to water depletion conditions.

The present invention relates also to the hydrophilic plant growth substrate that is obtainable in the manufacturing process as disclosed herein before. Although partly the traditional of phenol formaldehyde resin is removed and substituted by furan resin, the hydrophilic plant growth substrate according to the present invention has such physical properties (density, bending strength and compression strength) that it is usable under identical handling, transportation and growth conditions as the traditional plant growth substrates.

The following example shows the suitability of the hydrophilic plant growth substrate according to the present invention which comprises a combination of a phenol formaldehyde resin (as a polymer) and a furan resin (as a polymer).

The furan resin provides the hydrophilic properties which are retainable under plant growth conditions and under nutrient flushing conditions because the furan resin is substantially irreversably connected to the mineral wool fibres on which it is cured. The relatively small amount of furan resin in view of the phenol formaldehyde resin results in lower manufacturing costs while avoiding the use of a wetting agent.

EXAMPLE

A plant growth substrate was conventionally produced in a density of about 75 kg/m$^3$. Phenol formaldehyde resin was applied to airborn mineral wool fibres upstream from the nozzle via which the furan resin is applied to the airborn mineral wool fibres. The amount of applied furan resin is 20% of the total amount of applied binder and the amount of phenol formaldehyde resin is 80% of the applied binder. The total amount of binder applied was about 2.3 wt % of the plant growth substrate.

In a curing oven the binder comprising phenol formaldehyde resin and furan resin is cured. After curing the mineral wool substrate according to the invention is tested for density, bending strength, compression strength, ignition loss and water retaining capacity.

The hydrophilic properties are also tested in a sinking test.

For comparison reasons a plant growth substrate according to the prior art was produced when using solely phenol formaldehyde resin in an amount of about 2.3 wt % and 0.03 to 0.07 wt % Triton.

The bending strength is determined in a plant growth substrate having a length of 1 meter and a width of 15 cm and is supported at 10 and 90 cm. Bending is determined by placing a load of 500 gr in the center and by determining the distance over which the substrate is sagged.

The elastic modulus is determined under standard testing conditions in a testing sample of 25×25×7.5 cm. Fresh (after 1 hour in nutrient solution) and after 25 days in nutrient solution.

The water retaining capacity properties are determined using standard testing apparatus for determining the pF-curve.

The first plant growth experiments have shown good and promising growth and harvest results for vegetables and cut flowers.

| Properties | Plant growth substrate invention | Prior art plant growth substrate |
|---|---|---|
| Density (kg/m$^3$) | 77 ± 2 | 73 ± 2 |
| Bending strength (mm) | 5 ± 1 | 6 ± 1 |
| E-mod. (N/cm$^2$) | | |
| after 1 hour | 23 ± 2 | 21 ± 5 |
| after 25 days | 17 ± 1 | 15 ± 0 |
| Ignition loss (% m/m) | 2.0 ± 0.1 | 2.2 ± 0.1 |
| Water retaining capacity (% v/v) | | |
| Saturated (3,25 cm) | 92 ± 0 | 90 ± 1 |
| −10 cm | 89 ± 1 | 61 ± 1 |
| −21.25 cm | 23 ± 1 | 12 ± 0 |
| sinking test (sec.) | 15 ± 2 | 12 ± 3 |

What is claimed is:

1. A process for manufacturing a mineral wool plant growth substrate having a coherent hydrophilic matrix of mineral wool fibres connected by cured binder, said method comprising the steps of:

i. providing mineral wool fibres;
ii. applying to the mineral wool fibres as a binder a phenol-formaldehyde resin and a furan resin, wherein the binder does not contain a wetting agent;
iii. forming a matrix of the mineral wool fibres; and
iv. curing the binder.

2. The process as claimed in claim 1, wherein the phenol-formaldehyde resin is applied first and subsequently the furan resin is applied.

3. The process as claimed in claim 1, wherein the phenol-formaldehyde resin and the furan resin are applied via separate nozzles and/or spinning wheels.

4. The process as claimed in claim 1, wherein the furan resin is applied in an amount of 1–50% of the applied binder.

5. The process as claimed in claim 1, wherein the plant growth substrate has a water retaining capacity at −21.5 cm water column of at least 15% v/v.

6. The process as claimed in claim 1, wherein the plant growth substrate has a water retaining capacity at −10 cm water column of at least 70% v/v.

7. The process as claimed in claim 1, wherein the furan resin is applied in an amount of 5–40% of the applied binder.

8. The process as claimed in claim 1, wherein the furan resin is applied in an amount of 10–30% of the applied binder.

9. The process as claimed in claim 1, wherein the plant growth substrate has a water retaining capacity at −21.5 cm water column of at least 20% v/v.

10. The process as claimed in claim 1, wherein the plant growth substrate has a water retaining capacity at −21.5 cm water column of at least 15–40% v/v.

11. The process as claimed in claim 1, wherein the plant growth substrate has a water retaining capacity at −10 cm water column of at least 75% v/v.

12. The process as claimed in claim 1, wherein the plant growth substrate has a water retaining capacity at −10 cm water column of at least 70–95% v/v.

13. The process as claimed in claim 1, wherein the plant growth substrate has a water retaining capacity at −10 cm water column of at least 75–90% v/v.

\* \* \* \* \*